July 8, 1969     H. E. MAMACH     3,454,954
RECORDER CONSTRUCTION
Original Filed Oct. 5, 1966     Sheet _1_ of 5
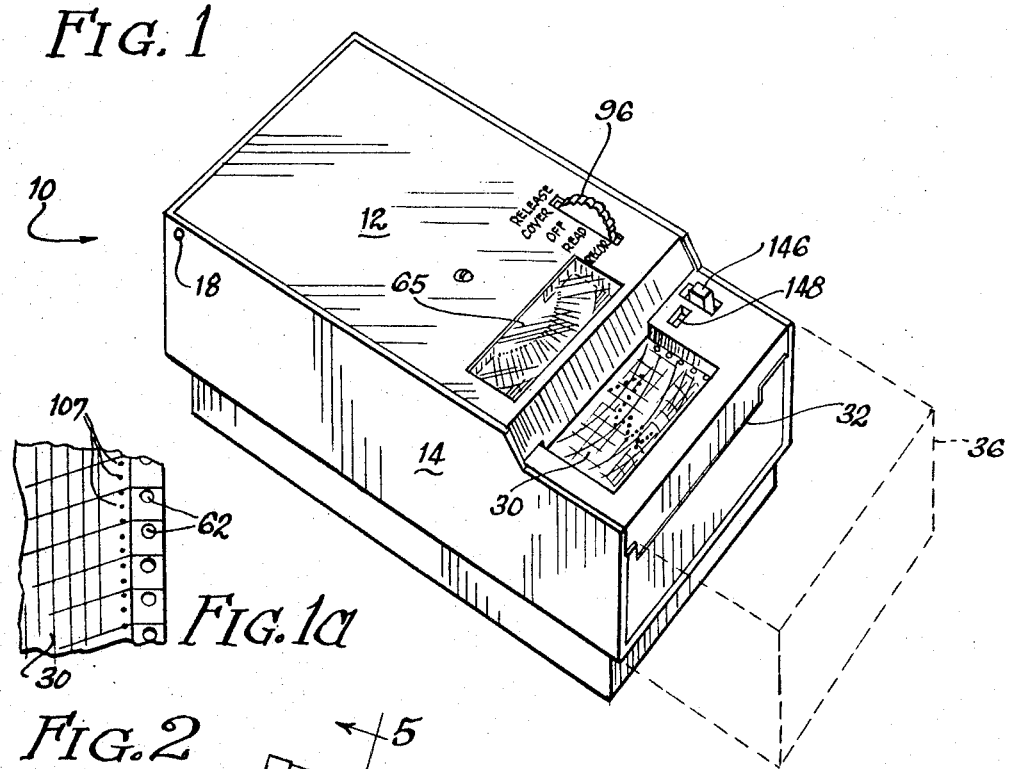
FIG. 1
FIG. 1a
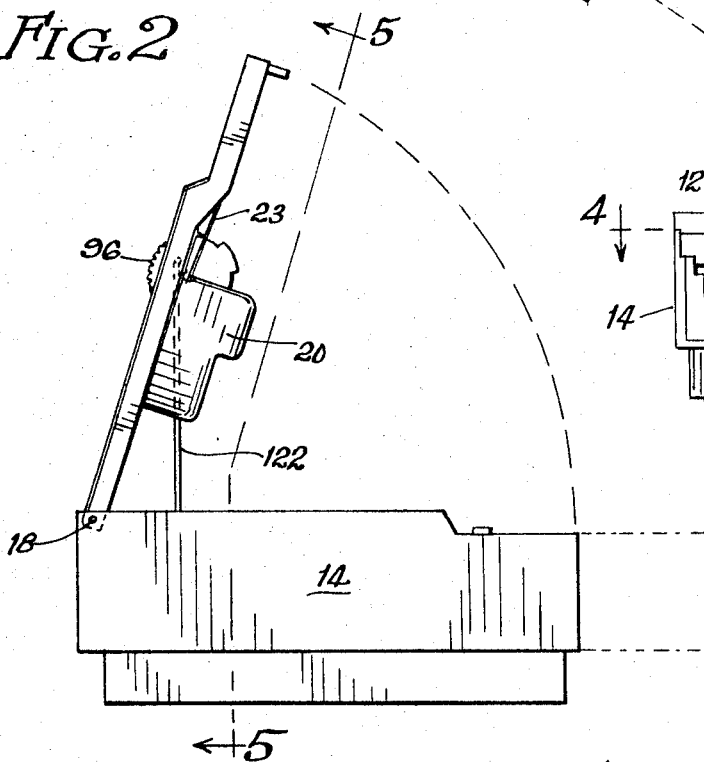
FIG. 2
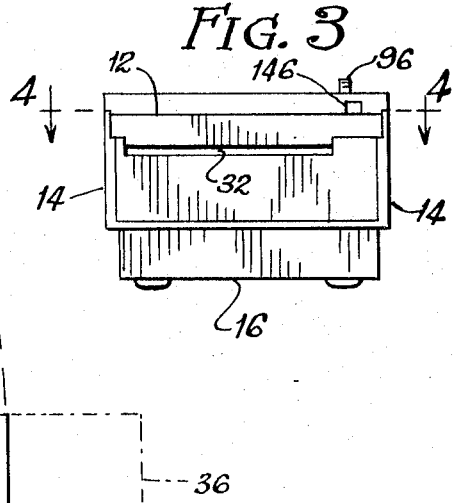
FIG. 3
INVENTOR
Harry E. Mamach
by McDougall, Hersh, Scott and Ladd
Attys July 8, 1969  H. E. MAMACH  3,454,954
RECORDER CONSTRUCTION
Original Filed Oct. 5, 1966  Sheet 3 of 5
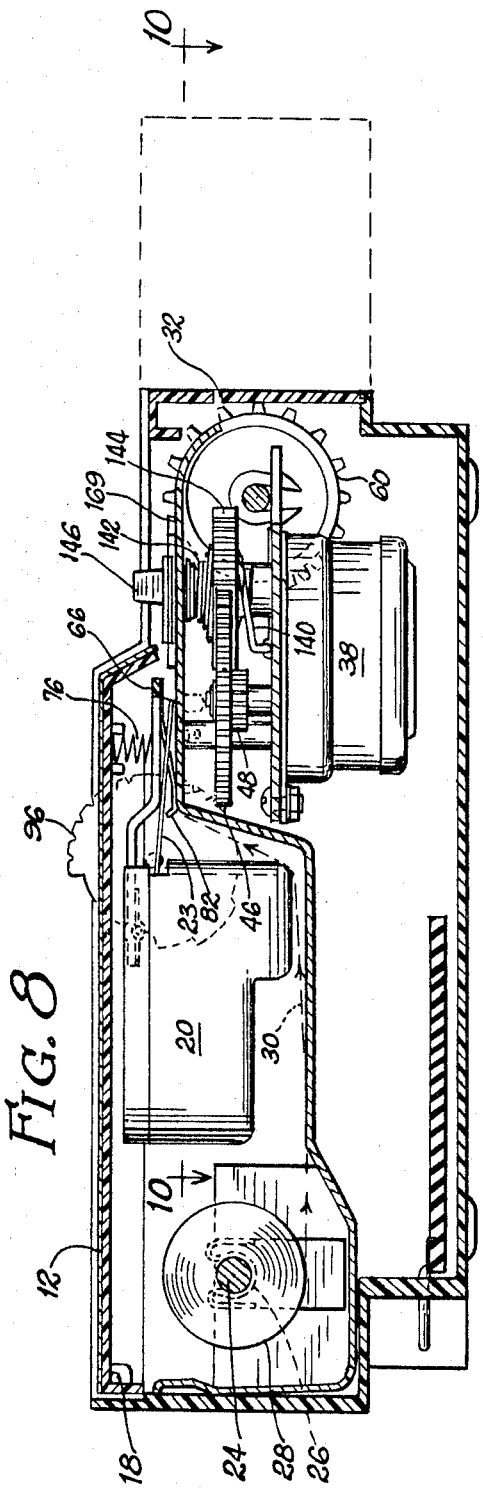
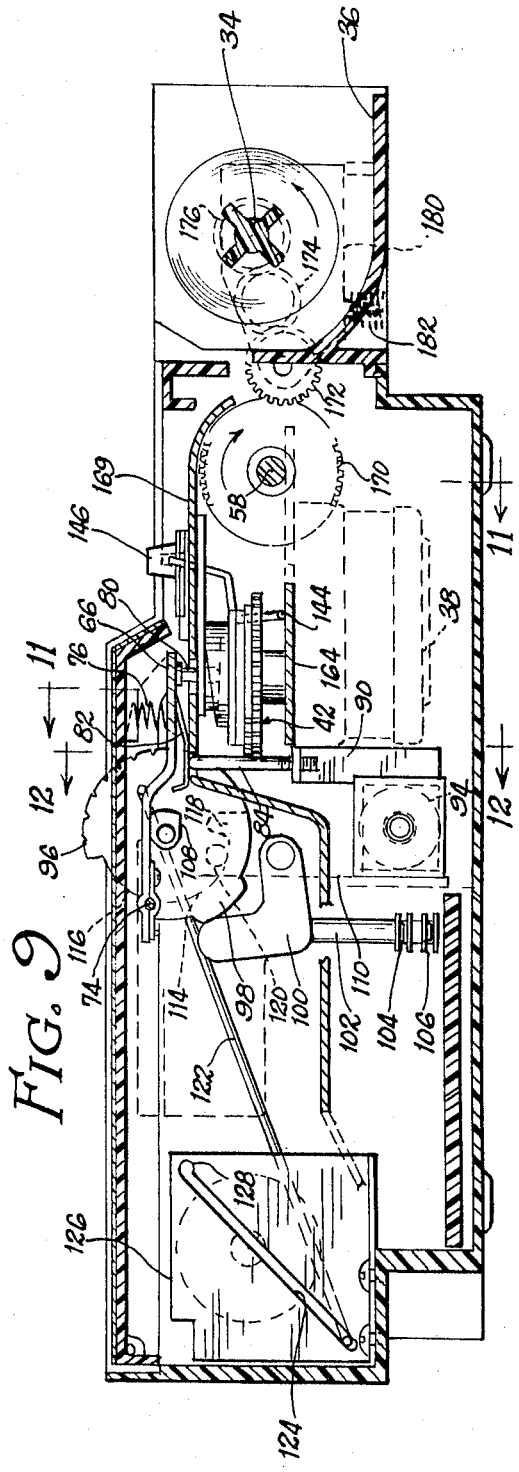

July 8, 1969     H. E. MAMACH     3,454,954

RECORDER CONSTRUCTION

Original Filed Oct. 5, 1966

3,454,954
RECORDER CONSTRUCTION
Harry E. Mamach, 625 Norwood Lane,
Schaumburg, Ill. 60172
Continuation of application Ser. No. 584,437, Oct. 5,
1966. This application May 17, 1968, Ser. No. 736,519
Int. Cl. G01d 9/30
U.S. Cl. 346—50                                 20 Claims

ABSTRACT OF THE DISCLOSURE

A recorder construction including detecting means such as a d'Arsonval movement which responds to variable conditions. A pointer is associated with the detecting means, and the pointer sweeps over a meter face. A chart is mounted within the recorder, and the chart is driven in the course of the recorder operation. The pointer includes a stylus at its outer end, and a clamp plate is provided for regularly moving the stylus into contact with the chart whereby a pattern of marks will be formed on the chart, depending upon the position of the pointer at the various intervals. The stylus moves in an arcuate path corresponding to the movement of the pointer which more accurately portrays the recorder operation provided. The clamping means for the stylus is located away from the main body of the pointer so that damage to the pointer and disruption of the meter movement can be minimized.

---

This application is a continuation of copending application Ser. No. 584,437, filed Oct. 5, 1966, and entitled "Recorder Construction" and now abandoned. This invention relates to a construction which is designed for providing a record of variable conditions. In particular, the invention is concerned with a recording device adapted to provide a visible recording of conditions on a chart.

The recording of variable conditions such as temperatures, changes in atmospheric or electrical characteristics, is required in numerous instances. In the operation of furnace constructions, for example, it is often desirable to provide a record of the changes in temperature within the furnace over certain periods of time.

A variety of means are available for providing such records, and many such constructions include means for displaying information on charts. Thus, visible markings can be recorded on a chart with the changes in positions of the markings along one axis indicating a change in condition while the position changes along the other axis will indicate time lapse. In the case of a furnace operation wherein temperatures rise and fall periodically, the visible markings will comprise a wavy line extending along the length of a chart.

It is a general object of the instant invention to provide an improved structure for achieving a record of variable conditions.

It is a more particular object of this invention to provide a structure of the type described which is adapted to provide a record of the changing conditions on a chart and which is also adapted to be employed as a meter structure whereby the conditions being measured can be instantaneously determined apart from the chart.

It is a still further object of this invention to provide a structure of the type described which is charatcerized by a high degree of versatility, which embodies a relatively non-complex arrangement of parts whereby the structure can be economically manufactured and maintained, and which is characterized by a basically simple mode of operation.

These and other objects of this invention will appear hereinafter and for purposes of illustration but not of limitation, specific embodiments of the invention are shown in the accompanying drawings in which:

FIGURE 1 is a perspective view of a recorder structure characterized by the features of this invention;

FIGURE 1A is a fragmentary view of a portion of a chart marked in accordance with one aspect of the invention;

FIGURE 2 is a side elevation of the recorder illustrating the cover in the open position;

FIGURE 3 is a front end view of the recorder;

Figure 10:
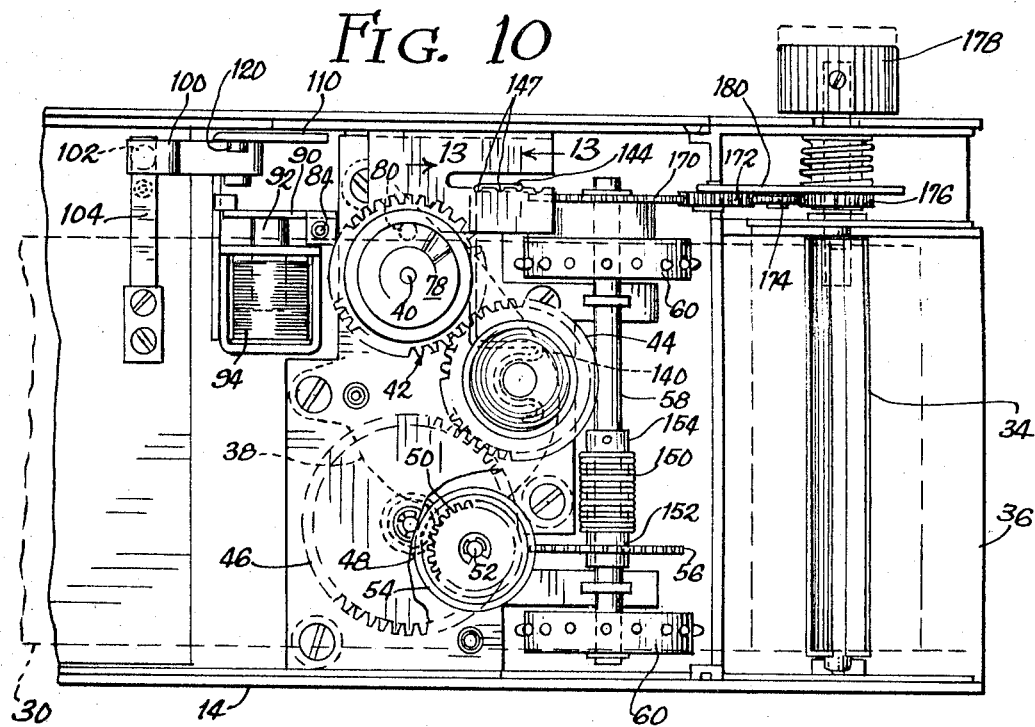
Figure 11:
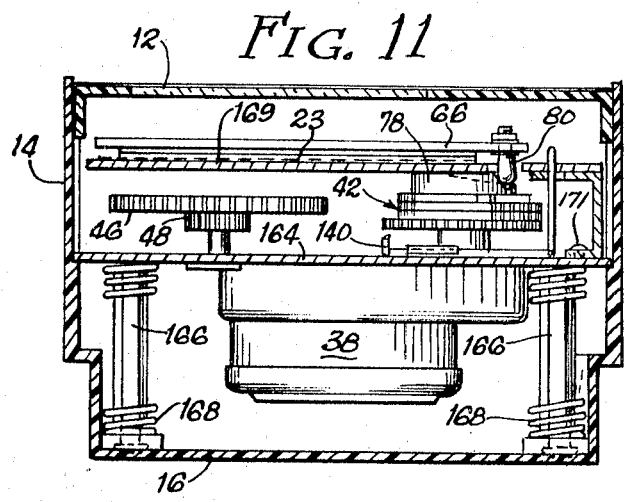
Figure 12:
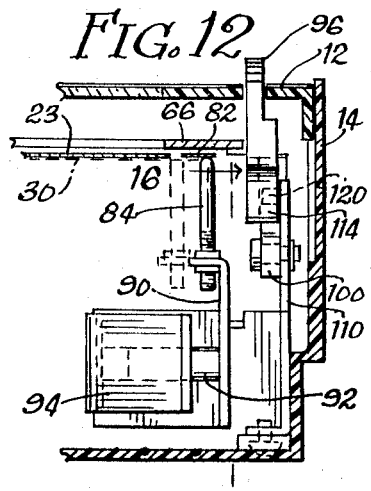
Figure 13:
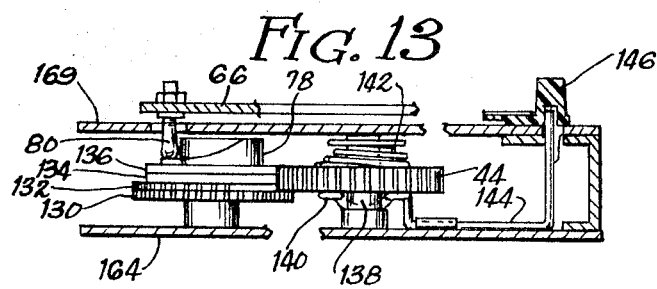
Figure 14:
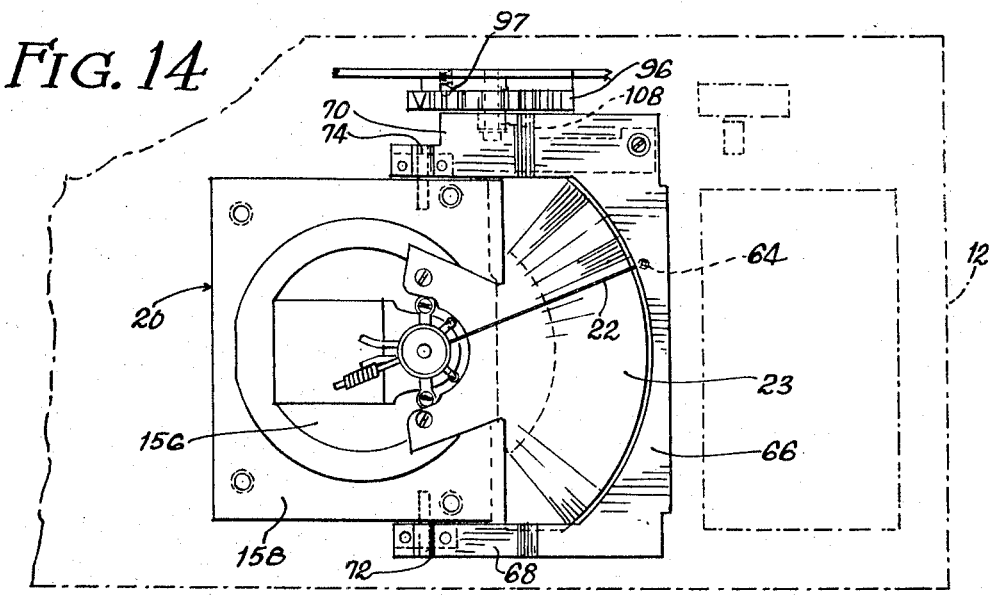
Figure 15:
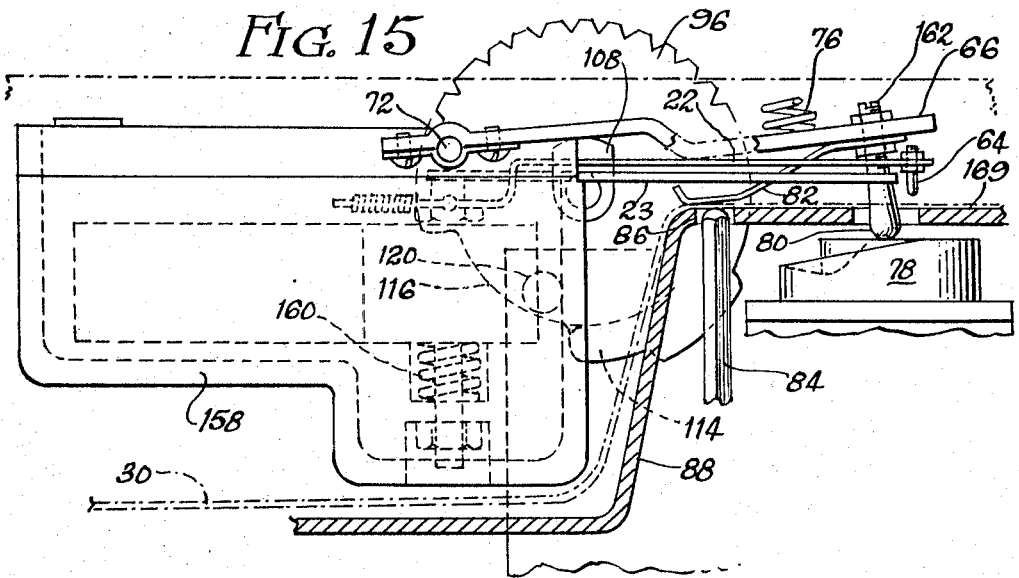
Figure 16:
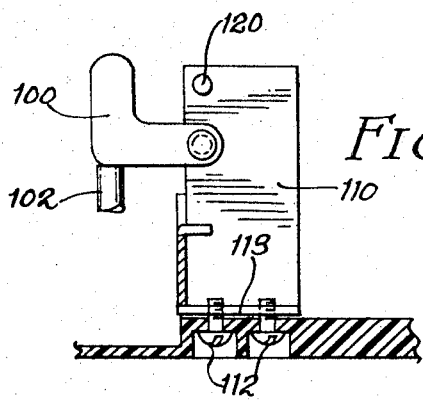

FIGURES 8 and 9 comprise longitudinal vertical sectional views of the recorder;

FIGURE 10 is a horizontal sectional view taken about the line 10—10 of FIGURE 8;

FIGURE 11 is a vertical sectional view taken about the line 11—11 of FIGURE 9;

FIGURE 12 is a vertical sectional view taken about the line 12—12 of FIGURE 9;

FIGURE 13 is a fragmentary stretch-out sectional view taken about the line 13—13 of FIGURE 10;

FIGURE 14 is a detail plan view illustrating the meter mechanism of the illustrated recorder;

FIGURE 15 is an enlarged fragmentary sectional view illustrating the co-action of the meter mechanism and recording mechanism; and, FIGURE 16 is a fragmentary sectional view taken about the line 16—16 of FIGURE 12.

The recorder 10 illustrated in the drawings comprises an outer housing including a cover 12, side walls 14 and bottom wall 16. The cover 12 is pivotally connected at 18 whereby the cover can be moved to the raised position illustrated in FIGURE 2. This provides access to the interior of the construction.

The recorder illustrated includes a galvanometer 20 mounted on the under side of the cover. Electrical connections are provided for the galvanometer whereby the indicator needle 22 is adapted to move across the face of a scale plate 23 in response to changes in electrical input to the galvanometer. It will be understood when considering the following description that other measuring devices can readily be associated with the recorder of this invention. Thus, the novel aspects of the instant invention are not dependent on the type of activity being measured and are only incidentally dependent on the type of unit employed for measuring the particular activity.

The main body of the housing rotatably carries a shaft 24 having its ends rotatably mounted at 26. A roll 28 of paper or other chart material is mounted on this shaft. A length of paper 30 is adapted to be fed out from the roll through the housing to the front end of the construction. As shown in FIGURE 8, a slot 32 may be provided for discharge of the paper. Alternatively, a take-up reel 34 can be rotatably mounted in an extension 36 provided at the front end of the housing.

The construction is provided with a drive motor 38. The drive shaft 40 of the motor carries a drive gear assembly 42 (FIGURES 9 and 11) which meshes with the gear 44. The gear 44 in turn meshes with gear 46 which carries drive pinion 48. This pinion drives gear 50 which is mounted on shaft 52. The shaft 52 also carries worm gear 54 which drives the gear 56. This gear is adapted to rotate shaft 58 which carries sprockets 60. The protrusions of these sprockets fit into holes 62 formed in the chart material whereby the chart can be carried through the construction.

The scale plate 23 is positioned intermediate the path of movement of the chart 30 and the indicator needle 22. A window 65 is formed in the cover 12 whereby the indicator needle 22 will be visible at all times.

In the preferred form of this invention, the indicator needle 22 extends beyond the scale plate 23 and a stylus tip 64 is formed at the end of the needle. The stylus tip is adapted to form marks on the recording paper whereby the location of the marks will correspond exactly to the respective locations of the needle. The invention contemplates the use of a pressure sensitive paper whereby the stylus tip can be simply pressed against the paper for formation of the desired mark. It will be understood, however, that other combinations could be employed for forming the marks on the chart.

The chart paper illustrated in the drawings has curved lines which correspond with the arc traversed by the stylus 64. Other chart papers could obviously be employed.

A clamp plate 66 is provided for purposes of pressing the stylus 64 against the chart. As best shown in FIGURE 14, the clamp plate comprises a U-shaped member including legs 68 and 70 pivotally mounted at 72 and 74, respectively. The central portion of the clamp plate has an interior edge which follows the configuration of the outer edge of the scale plate and which is spaced apart therefrom to permit freedom of movement of the clamp plate relative to the scale plate.

Figure 5:
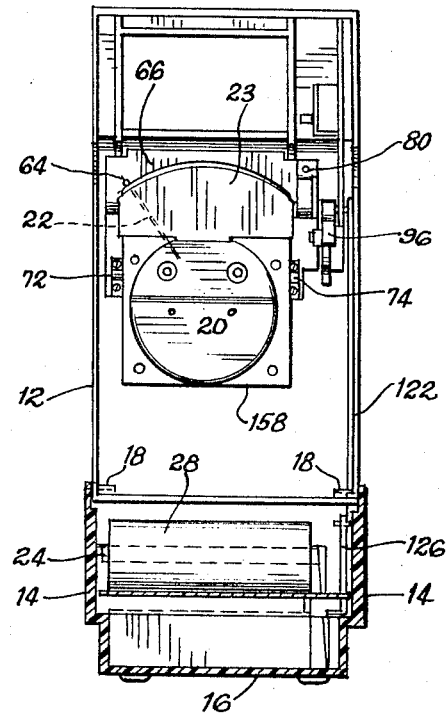
FIGURE 5 is a sectional view taken about the line 5—5 of FIGURE 2.
Figure 6:
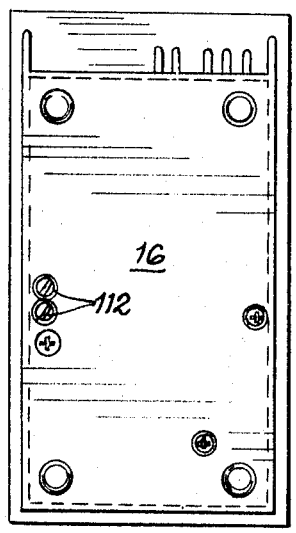
FIGURE 6 is a bottom view of the recorder.
Figure 7:
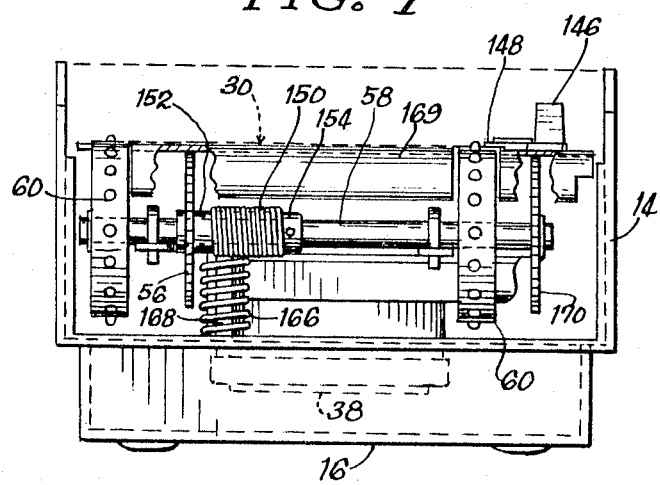
FIGURE 7 is a front end view taken about the line 7—7 of FIGURE 4 with the front plate removed.

As shown in FIGURE 5, the clamp plate is also mounted on the cover of the construction. A spring 76 is positioned between the interior surface of the cover and the top of the clamp plate. This spring normally urges the clamp plate away from the interior surface of the cover and into engagement with the stylus 64.

The drive shaft 40 of the motor 38 also carries a cam 78. A cam follower 80 is connected to the clamp plate 66 and extends into engagement with the cam surface, as the cam 78 is rotated by the drive shaft 40. When a recording operation takes place, the cam follower and spring 76 cause the clamp plate 66 to move up and down into engagement with the stylus 64.

The clamp plate 66 carries a leaf spring 82 on its under side (FIGURES 9 and 15). A second marking stylus 84 is positioned beneath this leaf spring, and this stylus is adapted to extend into an opening 86 defined in the wall 88 under which the chart 30 passes. When the stylus 84 is in operating position, a mark is adapted to be formed on the under side of the chart due to the pressure exerted by the leaf spring when the clamp plate is lowered.

The stylus 84 is secured to a bracket 90 which is in turn attached to the core 92 of a solenoid 94. As shown in FIGURE 12, the stylus 84 moves into position for marking the paper when the solenoid is energized. Energization of the solenoid is preferably controlled by some independent activity whereby the stylus 84 can be characterized as an event recorder. For example, the solenoid could be energized each time a compressor begins operation in a refrigerating system and the stylus 84 would record as long as the compressor remained operative. The stylus 64 would, of course, be measuring temperature or some other condition whether or not the compressor is operating.

The cover 12 of the construction carries a selector knob 96 which is employed for controlling the operation of the recorder. As shown in FIGURE 1, the selector knob has four positions comprising the "record" position, the "read" position, the "off" position, and the "release cover" position. Detent ball 97 (FIGURE 14) may fit into appropriate depressions on the knob to hold it in the desired positions.

The knob is shown in the "record" position in FIGURES 8 and 9. In this position, a protruding portion 98 formed in the knob engages a lever 100. This lever is in engagement with a pin 102 which is operatively connected to a pair of switches 104 and 106. The switch 104 is connected to the galvanometer 20 and the switch 106 is connected to the motor 38. In the "record" position, both the galvanometer and motor will be operating whereby the chart will be driven through the construction and the respective styli will periodically mark the chart.

The marks formed by the stylus 64 will provide a pattern as shown in FIGURE 1. Thus, the marks will be formed in random locations, depending upon the changes in position of the needle 22. The stylus 84 will form marks as shown at 107 in FIGURE 1a. These marks are formed at regular intervals in a straight line along the edge of the papers as long as the solenoid 94 is energized. Since the cam for the clamp plate is directly tied to the motor 38, the operation of the clamp plate will always operate at the same rate. As noted, the marks 107 can be employed as a means for determining the occurrence of an event which takes place periodically through a recording cycle.

The knob 96 carries a lifter element 108 which is positioned beneath the leg 70 of the clamp plate 66 (FIGURE 9). When the knob is in the "record" position described, the lifter 108 assumes the position of FIGURE 9 whereby the clamp plate is adapted to rise and fall in response to the action of the cam 78. When the knob is rotated to the "read" position, however, the lifter 108 operates to raise the clamp plate in opposition to the spring 76 whereby the cam follower 80 will not drop into the cam recesses as the cam rotates. Accordingly, the clamp plate will not act on the stylus 64 to form marks on the chart.

The movement to the "read" position involves a rotation of the knob of about 30° whereby the protruding portion 98 will move to an intermediate position between the arms of the lever 100. This results in raising of the pin 102 thereby breaking the contacts 106 while the contacts 104 still remain closed. Accordingly, the galvanometer will continue to operate while the motor 38 is inoperative. The lifter 108 will hold the clamp plate away from the needle 22 even if the motor stops with the cam follower 80 in the depression of the cam 78. This permits free movement of the galvanometer needle for calibration and observation.

When in the "off" position, the projecting member 98 of the knob allows the lever 100 to assume the position shown in FIGURE 16 whereby both the switches 104 and 106 will be open. Since a relatively delicate positioning of the lever is required, the lever is mounted on a bracket 110 which is adapted to be raised and lowered by means of adjusting screws 112. The rise 113 also permits tilting of the bracket. With this arrangement, the condition of the switches 104 and 106 can be precisely determined relative to the position of the control knob 96.

The release cover position of the knob is illustrated in FIGURE 15. The knob defines a flange portion 114 which extends between an open area 116 and a stop 118 (see FIGURE 9). When the cover is first closed, the knob can be rotated 90° until a pin 120 formed in the bracket 110 engages the stop 118. This pin extends over the flange 114 (FIGURE 12) whereby the cover is locked in place. The engagement of the pin 120 with the flange 114 is maintained in the "record," "read" and "off" positions. Rotation to the release cover position, however, moves the opening 116 into registry with the pin 120 whereby the cover can be raised.

The cover is adapted to be held in the raised position by means of a rod 122 (FIGURES 2, 5 and 9). The lower end of the rod 122 is bent at right angles for movement in a slot 124 formed in a bracket 126. In the extended position, the rod will seat in the hollow 128 of the slot 124, and the weight of the cover will hold the end of the rod in this hollow until it is manually released.

As previously indicated, the gear assembly 42 is provided for varying the speed of the chart as it passes through the construction. The gear assembly illustrated comprises a set of four gears 130, 132, 134 and 136. The lower gear 130 is provided with teeth on its entire periphery, and when the gear 44 meshes with this lower gear, the chart will move through the construction at a rate dependent upon the speed of the synchronous drive motor 38.

The next gear 132 has an open space among the teeth on its periphery whereby the gear 44 will be disengaged for a portion of the revolution of the drive gear 132. The gears 134 and 136 have successively larger peripheral portions free of gear teeth. Accordingly, when the gear 44 is engaged with either of these other drive gears, the chart movement will be smaller for a given revolution of the drive gears.

Where gears are provided with an open space on their peripheries, there will be a hesitation in the chart movement during each cycle of the drive gears. The cam may be positioned relative to these open spaces whereby the styli will be pressed against the chart while the chart is stopped. Naturally, the period of hesitation will be larger as the size of the open space in the gear increases. All of the gears may have an open space; however, it is not necessary for the chart to be stopped for marking.

The assembly of gears 42 is fixed to the drive shaft 40. The gear 44 which is driven by the gear assembly 42 is vertically movable on shaft 138. A lever arrangement 140 engages the under side of the gear 44 whereby the gear can be moved upwardly on the shaft 138 in opposition to the action of spring 142.

Figure 4:
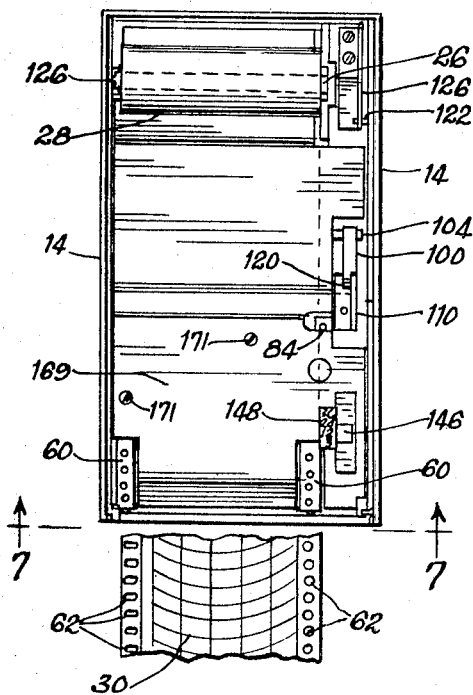
FIGURE 4 is a plan view of the recorder with the cover removed taken about the line 4—4 of FIGURE 3.

The lever 140 includes an extension 144 which is provided with a button 146 at its outer end. The button 146 is adapted to be shifted relative to indicator scale 148 (FIGURE 4) whereby an operator can raise and lower the gear 44 by shifting the position of the button 146. Detents 147 (FIGURE 10) may be employed to hold the lever 140 in the desired positions. The position of the gear 44 will determine the spacing between marks made by the styli since the driving action of the gear assembly 42 depends on the position of the gear 44. Obviously this gear 44 remains stationary whenever an open space is provided in the gears 130 through 136.

A one-way slip clutch arrangement is preferably employed in conjunction with the shaft 58 which carries the chart sprockets 60. The clutch consists of a tightly wound spring 150 wound over tubular sections 152 and 154 fitted around the shaft 58. These sections have the same diameter. Rotation of the section 154 opposite the direction of the wind of the spring tends to unwind the spring whereby only this section will rotate. This occurs when paper is pulled out of the construction, and since the section 152 is not driven by this action, the worm gear 54 will not act as a brake.

Rotation of the gear 56 tightens the spring to the extent that high friction is built up between the spring and the sections thereby locking the sections together. With this arrangement, the chart paper can be manually pulled from the recorder for setting a desired time mark on the chart or for purposes of removing enough chart for a record without stopping or opening the recorder.

FIGURES 14 and 15 illustrate the mounting arrangement for the galvanometer 20 and the clamp plate 66. The galvanometer includes a movement portion 156 which is connected to supporting structure 158 by means of resiliently mounted threaded members 160. As noted, the clamp plate is pivotally attached to the structure 158 at 72 and 74.

With this arrangement, the movement portion of the galvanometer can be readily adjusted relative to the clamp plate. Adjustment of the needle 22 relative to the clamp plate is particularly critical since this will determine the amount of pressure exerted by the clamp plate on the stylus 64. It will be noted that the cam follower 80 has a threaded end 162 whereby the cam follower can be adjusted with respect to the cam plate.

A further adjustment is provided by means of the supporting structure for the gear assembly 42 and cam 78. The gear plate 164 which carries these elements is mounted on posts 166 (FIGURE 11) which are screwed into the bottom wall 16 of the construction. Springs 168 provide resilient mounts, and the gear plate 164 can then be adjusted to a very fine degree.

A pressure platen 169 is attached to the gear plate by means of screws 171. The aforementioned adjustment affects the position of this pressure platen whereby the amount of pressure exerted by the stylus 64 can be regulated. The stylus 84 is threaded to its supporting bracket 90 to provide for further adjustment.

The means 18 for pivotally attaching the cover 12 to the side walls 14 may also be designed to permit desired adjustments. Two headless set screws can, for example, be inserted in threaded bores defined by the cover and side walls. Counterclockwise rotation of the screw on one side and clockwise rotation of the other screw will provide lateral adjustments of the cover. This will align the galvanometer movement which is mounted in the cover with the chart paper located in the case.

The adjustment of the bracket 110 to provide for positioning of the lever 100 also provides adjustment of the position of the stop member 120. This is particularly true with respect to the screws 112 since a rocking movement of the bracket is achieved whereby the stop member will precisely engage the surface of the flange 114.

The take-up reel 34, which may be employed at the front of the construction, is driven by means of gear 170 mounted on the shaft 58. Intermediate gears 172 and 174 provide a direct connection with gear surface 176 of the take-up reel. The gear 176 is attached to clutch knob 178 which is adapted to be pulled outwardly for disengagement from the gear 174.

The gear train including gears 172, 174 and 176 is pivotally mounted on plate 180. Spring means 184 normally push the gear train into mesh with the power take off gear 170.

This arrangement accommodates conditions which come about due to chart paper tension. Thus, the chart is driven by the recorder at a constant velocity and as the chart winds up on the take-up reel, the reel becomes larger in diameter. This over-winding puts the chart paper in tension which in turn builds up load in the gear train. The power take off gear 170 eventually overcomes the force of the spring which normally presses the take-up gear train against the gear 170. The gear train is momentarily thrown out of mesh with the gear 170 at which time the paper tension is relieved. The gear train then swings back into mesh with the gear 170.

That which is claimed is:

1. In a recorder construction comprising detecting means operating in response to variable conditions, indicator means associated with said detecting means for pivotal movement about an axis, a scale plate traversed by said indicator means to provide instantaneous readings of said conditions, a chart positioned in said construction and means for moving the chart through the construction along a path adjacent said detecting means, a marking means, and means for periodically operating said marking means to apply marks on said chart whereby a pattern of marks is formed on the chart, the positions of the respective marks being determined by the position of said indicator means at the time a mark is applied to said chart, the improvement wherein said indicator means extends over and beyond said scale plate, said marking means being located on the side of said scale plate opposite said axis and comprising an extension of said indicator means, and wherein said marking means comprises a stylus attached at the end of said indicator means, and including a clamp means for pressing said stylus into engagement with said chart, said stylus forming marks on the chart to provide an indication of the position of said indicator means, and wherein said stylus moves in an arcuate path in response to movement of said indicator means, and including second marking means for applying marks along the edge of said chart, drive means for shifting said second marking means between operative and inoperative positions, said drive means operating independently of said clamp means whereby said clamp means operate in both the operative and inoperative positions of said second marking means, said second marking means operating simultaneously with said first marking means when said drive means shift the second marking means to the operative position to provide a measure of the frequency and duration of a recording operation.

2. A construction in accordance with claim 1 including cam means operatively connected to the stylus to provide said periodic marking, and wherein a single driven motor is employed for operating said cam means and for moving said chart through the construction.

3. A construction in accordance with claim 2 wherein said cam means is connected to the drive shaft of said motor whereby the cam means rotates continuously, drive gear means connected to said shaft, and means connected to said drive gear means for moving the chart through the construction.

4. A construction in accordance with claim 3 wherein said drive gear means comprise an assembly of gears, each of said gears being adapted to impart different driving speeds to the means for moving the chart through the construction.

5. A construction in accordance with claim 1 including means for adjusting the relative positions of said detecting means and said clamp means.

6. A construction in accordance with claim 1 including a pressure platen over which said chart moves during operation of the construction and including means for adjusting the position of said pressure platen.

7. A construction in accordance with claim 1 including a cover, a control knob associated with said cover for operating the construction, said knob including a locking position and means defined by the knob for engagement with a stop member defined by the construction for holding said cover in locked position during recording.

8. A construction in accordance with claim 7 including means defined by said knob for holding said marking means in an inoperative position whereby said detecting means are adapted to function independently of the chart.

9. A construction in accordance with claim 7 including means defined by said knob for engagement with control switches, one of said switches being adapted to initiate operation of said detecting means and another of said switches being adapted to initiate operation of a motor employed for imparting movement to said chart, and wherein said first mentioned switch is adapted to be closed by the control knob while the latter switch remains in the open position.

10. A construction in accordance with claim 1 wherein said detecting means is supported on a pivotally mounted member, the chart supporting means being mounted in the recorder separately from said pivotally mounted member whereby the detecting means is adapted to be moved away from the chart support for access thereto, and including means for laterally adjusting said pivotally mounted member relative to the chart support for thereby lining up said detecting means with the chart.

11. A construction in accordance with claim 1 including a take-up reel mounted in said construction for receiving the chart after application of said marks thereto, and including self-adjusting drive means associated with the take-up reel to offset build-up in tension in the chart as the amount of chart material on the take-up reel increases.

12. A construction in accordance with claim 1 wherein said chart is driven through the construction by means of sprocket elements, and including clutch means permitting release of the sprocket drive whereby the chart can be manually pulled through the construction.

13. A construction in accordance with claim 1 wherein said chart comprises a pressure-sensitive paper.

14. A construction in accordance with claim 1 including a take-up reel assembly, said assembly including a drive gear for driving said take-up reel, and wherein said means for moving the chart through the construction include an assembly of drive gears, and wherein the drive gear associated with the take-up reel assembly is adapted to mesh with the drive gears for said chart.

15. In a recorder construction comprising detecting means operating in response to variable conditions, indicator means associated with said detecting means, a chart positioned in said construction and drive means for moving the chart through the construction along a path adjacent said indicating means, a marking means, and means for periodically operating said marking means to apply marks on said chart whereby a pattern of marks is formed on the chart, the positions of the respective marks being determined by the position of said indicator means at the time a mark is applied to said chart, the improvement wherein said drive means for moving said chart comprises a variable speed drive means, said variable speed drive means including an assembly of gears, at least some of said gears having discontinuities in the gear teeth whereby the driving action imparted thereby will cease during a portion of each revolution to provide a hesitation in the chart movement, the extent of said discontinuities varying in the respective gears whereby the chart movement will vary depending upon which gear is engaged.

16. A construction in accordance with claim 15 wherein said gears are co-axially mounted on a shaft, and including control means accessible from the exterior of the construction for axially moving said shaft to thereby engage and disengage the respective gears for purposes of varying the chart movement.

17. In a recorder construction comprising detecting means operating in response to variable conditions, indicator means associated with said detecting means for pivotal movement about an axis, a scale plate traversed by said indicator means to provide instantaneous readings of said conditions, a chart positioned in said construction and means for moving the chart through the construction along a path adjacent said detecting means, a marking means, and means for periodically operating said marking means to apply marks on said chart whereby a pattern of marks is formed on the chart, the positions of the respective marks being determined by the position of said indicator means at the time a mark is applied to said chart, the improvement wherein said indicator means extends over and beyond said scale plate, said marking means being located on the side of said scale plate opposite said axis and comprising an extension of said indicator means, and wherein said marking means comprises a stylus attached at the end of said indicator means, and including a clamp means for pressing said stylus into engagement with said chart, said stylus forming marks on the chart to provide an indication of the position of said indicator means, and wherein said stylus moves in an arcuate path in response to movement of said indicator means, and including cam means operatively connected to the stylus to provide said periodic marking, a single drive motor for operating said cam means and for moving said chart through the construction, said cam means being connected to the drive shaft of said motor whereby the cam means rotates continuously, drive gear means connected to said shaft, means connected to said drive gear means for moving the chart through the construction, said drive gear means comprising an assembly of gears, each of said gears being adapted to impart different driving speeds to the means for moving the chart through the construction, and wherein at least a portion of the gears in said assembly include discontinuities in the gear teeth whereby the driving action imparted thereby ceases during a portion of each revolution to provide a hesitation in the chart movement, and wherein said stylus is adapted to be pressed against the chart during said hesitation.

18. In a recorder construction comprising detecting means operating in response to variable conditions, indicator means associated with said detecting means for pivotal movement about an axis, a scale plate traversed by said indicator means to provide instantaneous readings of said conditions, a chart positioned in said construction and means for moving the chart through the construction along a path adjacent said detecting means, a marking means, and means for periodically operating said marking means to apply marks on said chart whereby a pattern of marks is formed on the chart, the positions of the respective marks being determined by the position of said indicator means at the time a mark is applied to said chart, the improvement wherein said indicator means extends over and beyond said scale plate, said marking means being located in the side of said scale plate opposite said axis and comprising an extension of said indicator means, and wherein said marking means comprises a stylus attached at the end of said indicator means, and including a clamp means for pressing said stylus into engagement with said chart, said stylus forming marks on the chart to provide an indication of the position of said indicator means, and wherein said stylus moves in an arcuate path in response to movement of said indicator means, and wherein said detecting means is supported on a pivotally mounted member, the chart supporting means being mounted in the recorder separately from said pivotally mounted member whereby the detecting means is adapted to be moved away from the chart support for access thereto, and including means for laterally adjusting said pivotally mounted member relative to the chart support for thereby lining up said detecting means with the chart.

19. A construction in accordance with claim 1 including mounting means for said second marking means, said drive means shifting said mounting means laterally of the direction of movement of said chart to thereby move said second marking means between an inoperative position outside the edge of said chart and an operative position in opposed relationship with the surface of the chart.

20. A construction in accordance with claim 19 including means carried by said clamp means for pressing said chart against said second marking means when the second marking means is in the operative position.

References Cited

UNITED STATES PATENTS

| | | | |
|---|---|---|---|
| 796,675 | 8/1905 | Rypinski et al. | 346—93 |
| 963,908 | 7/1910 | Lee | 364—34 X |
| 1,124,820 | 1/1915 | Simonsson | 346—79 X |
| 1,422,920 | 7/1922 | Brown et al. | 346—46 X |
| 1,757,012 | 5/1930 | Foote | 346—106 X |
| 1,861,697 | 6/1932 | Hickok et al. | 346—77 |
| 2,924,499 | 2/1960 | Young et al. | 346—145 |
| 3,015,536 | 1/1962 | Nielsen et al. | 346—136 |
| 3,048,848 | 8/1962 | May | 346—78 |
| 3,051,408 | 8/1962 | Finch | 346—145 X |
| 3,129,998 | 4/1964 | Lackoff | 346—78 |

RICHARD B. WILKINSON, *Primary Examiner.*

JOSEPH W. HARTARY, *Assistant Examiner.*

U.S. Cl. X.R.

346—78, 145.